United States Patent

Satou

Patent Number: 5,822,327
Date of Patent: Oct. 13, 1998

[54] DEVICE AND METHOD FOR CONVERTING A TRANSMISSION RATE BY ADDING DUMMY DATA

[75] Inventor: Atsuhiko Satou, Tokyo, Japan

[73] Assignee: OKI Electric Industry Co., Ltd., Tokyo, Japan

[21] Appl. No.: 665,462

[22] Filed: Jun. 18, 1996

[30] Foreign Application Priority Data

Jun. 26, 1995 [JP] Japan .................................. 7-159074

[51] Int. Cl.⁶ .................................................. H04L 7/04
[52] U.S. Cl. ........................................ 370/505; 375/372
[58] Field of Search .................................. 370/465, 466, 370/468, 505, 506, 477, 470, 546; 375/371, 372

[56] References Cited

U.S. PATENT DOCUMENTS

| | | | |
|---|---|---|---|
| 4,224,473 | 9/1980 | Kaul et al. ................................ | 370/505 |
| 4,596,026 | 6/1986 | Cease et al. .............................. | 370/505 |
| 5,263,056 | 11/1993 | Urbansky ................................ | 370/505 |
| 5,263,057 | 11/1993 | Nawrocki et al. ....................... | 370/505 |
| 5,276,688 | 1/1994 | Urbansky ................................ | 370/505 |
| 5,313,502 | 5/1994 | Nawrocki et al. ....................... | 370/505 |
| 5,331,671 | 7/1994 | Urbansky ................................ | 370/505 |
| 5,384,774 | 1/1995 | Martin et al. ........................... | 370/505 |

*Primary Examiner*—Chau Nguyen
*Attorney, Agent, or Firm*—Spencer & Frank

[57] ABSTRACT

In a transmission rate converting device, a write data serial-to-parallel converter converts data input to the device to parallel data. A frame pattern generator adds dummy data to the parallel data such that each multiframe forms a multiframe pattern subjected to conversion. The parallel data with the dummy data are written to a RAM (Random Access Memory) included in a FIFO (First-In First-Out) memory via a write port and then read thereoutof. A read data parallel-to-serial converter converts the parallel data read out of the RAM to serial data. A clock comparison and control controls a write clock generator and a read clock generator such that the number of frames stored in the RAM remains in a predetermined range.

5 Claims, 10 Drawing Sheets

*Fig. 3*

| 0 | 1 | 2 | 3 | 4 | 5 | 6 | 7 | 8 | 9 | 10 | 11 | 12 | 13 | 14 | 15 | 16 | 17 | 18 | 19 | 20 | 21 |

→ TIME

*Fig. 4*

↓ TIME

| 0 | 1 | 2 | 3 | 4 | 5 | 6 | 7 | 8 | 9 | 10 |
|---|---|---|---|---|---|---|---|---|---|---|
| 11 | 12 | 13 | 14 | 15 | 16 | 17 | 18 | 19 | 20 | 21 |
| 22 | 23 | 24 | 25 | 26 | 27 | 28 | 29 | 30 | 31 | 32 |
| 33 | 34 | 35 | 36 | 37 | 38 | 39 | 40 | 41 | 42 | 43 |
| 44 | 45 | 46 | 47 | 48 | 49 | 50 | 51 | 52 | 53 | 54 |
| 55 | 56 | 57 | 58 | 59 | 60 | 61 | 62 | 63 | 64 | 65 |
| 66 | 67 | 68 | 69 | 70 | 71 | 72 | 73 | 74 | 75 | 76 |
| 77 | 78 | 79 | 80 | 81 | 82 | 83 | 84 | 85 | 86 | 87 |
| 88 | 89 | 90 | 91 | 92 | 93 | 94 | 95 | 96 | 97 | 98 |
| 99 | A0 | A1 | A2 | A3 | A4 | A5 | A6 | A7 | A8 | A9 |

*Fig. 5*

| FRAMES | b0 | b1 | b2 | b3 | b4 | b5 | b6 | b7 | b8 | b9 | b10 | b11 |
|---|---|---|---|---|---|---|---|---|---|---|---|---|
| #0 | 0 | 0 | 0 | 0 | 0 | 0 | 0 | 0 | 0 | 0 | 0 | 0 |
| #1 | 1 | 0 | 1 | 2 | 3 | 4 | 5 | 6 | 7 | 8 | 9 | 10 |
| #2 | 1 | 11 | 12 | 13 | 14 | 15 | 16 | 17 | 18 | 19 | 20 | 21 |
| #3 | 1 | 22 | 23 | 24 | 25 | 26 | 27 | 28 | 29 | 30 | 31 | 32 |
| #4 | 1 | 33 | 34 | 35 | 36 | 37 | 38 | 39 | 40 | 41 | 42 | 43 |
| #5 | 1 | 44 | 45 | 46 | 47 | 48 | 49 | 50 | 51 | 52 | 53 | 54 |
| #6 | 1 | 55 | 56 | 57 | 58 | 59 | 60 | 61 | 62 | 63 | 64 | 65 |
| #7 | 1 | 66 | 67 | 68 | 69 | 70 | 71 | 72 | 73 | 74 | 75 | 76 |
| #8 | 1 | 77 | 78 | 79 | 80 | 81 | 82 | 83 | 84 | 85 | 86 | 87 |
| #9 | 1 | 88 | 89 | 90 | 91 | 92 | 93 | 94 | 95 | 96 | 97 | 98 |
| #10 | 1 | 99 | A0 | A1 | A2 | A3 | A4 | A5 | A6 | A7 | A8 | A9 |

*Fig. 6*

| ZEROTH FRAME | | | | | | | | | | | | 1ST FRAME | | | | | | | | | |
|---|---|---|---|---|---|---|---|---|---|---|---|---|---|---|---|---|---|---|---|---|---|
| b0 | b1 | b2 | b3 | b4 | b5 | b6 | b7 | b8 | b9 | b10 | b11 | b0 | b1 | b2 | b3 | b4 | b5 | b6 | b7 | b8 | b9 |
| 0 | 0 | 0 | 0 | 0 | 0 | 0 | 0 | 0 | 0 | 0 | 0 | 1 | 0 | 1 | 2 | 3 | 4 | 5 | 6 | 7 | 8 | 9 |

→ TIME

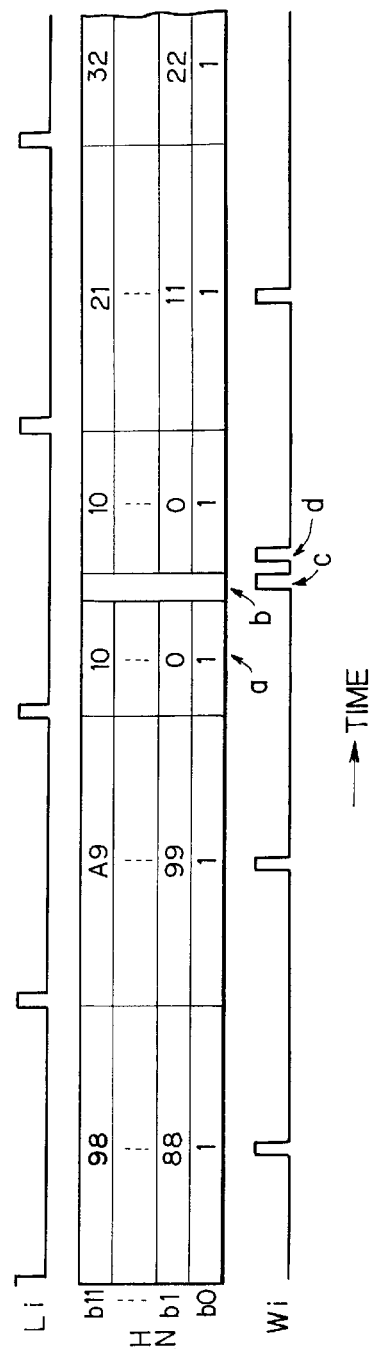

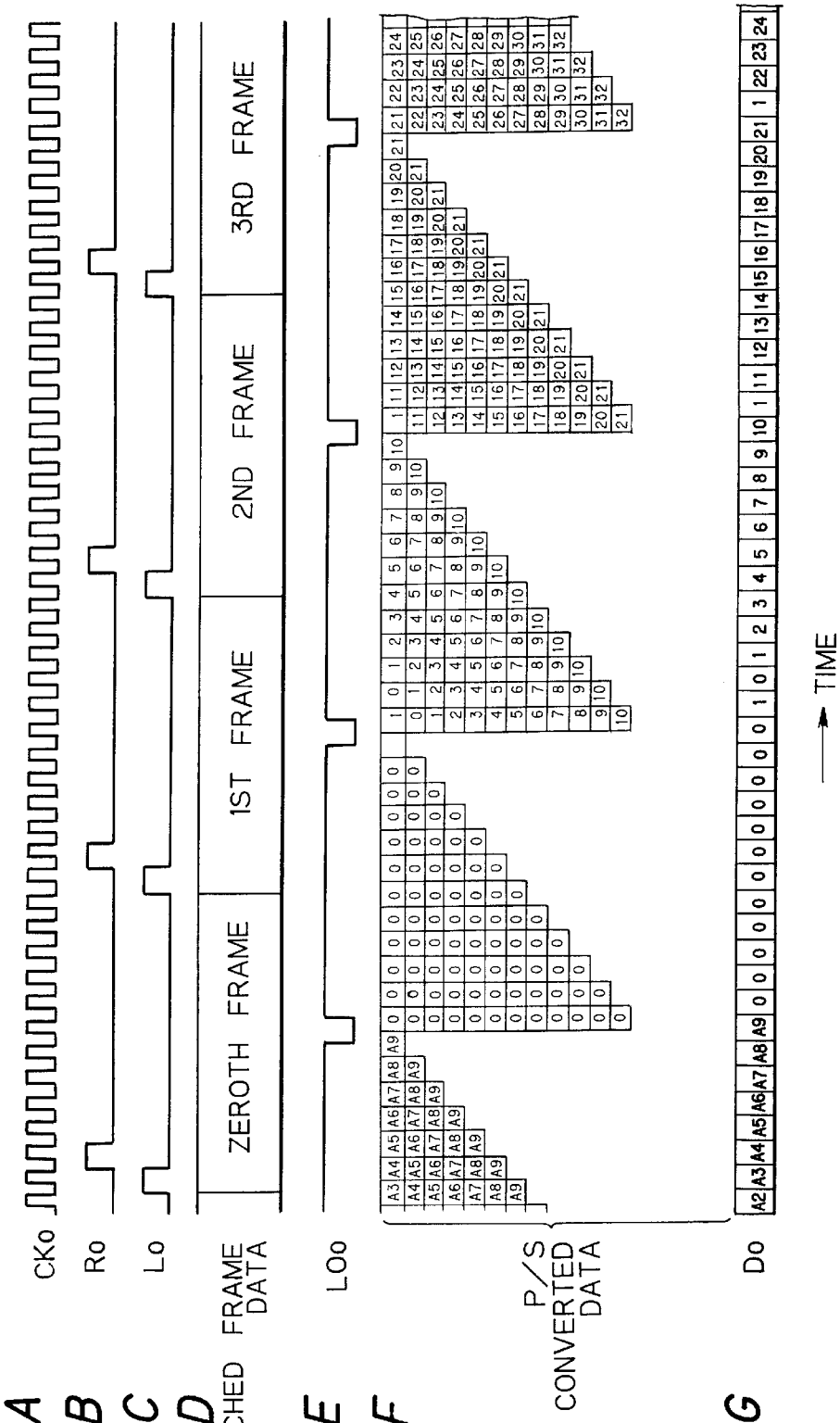

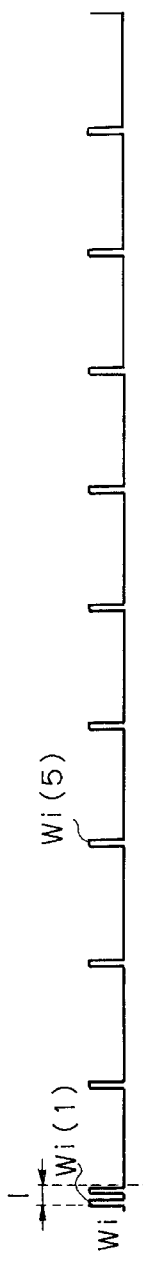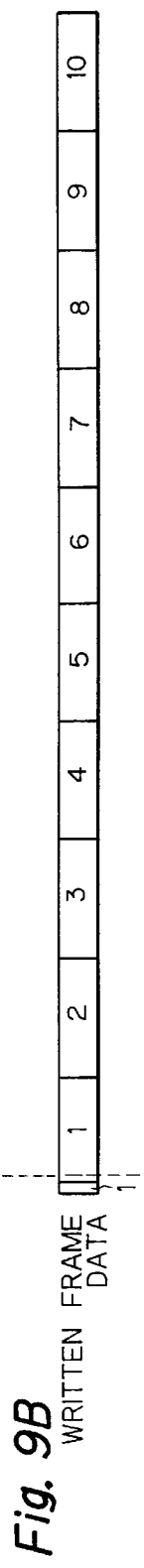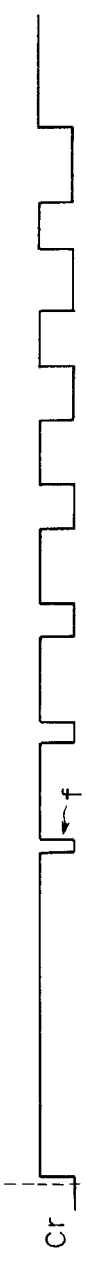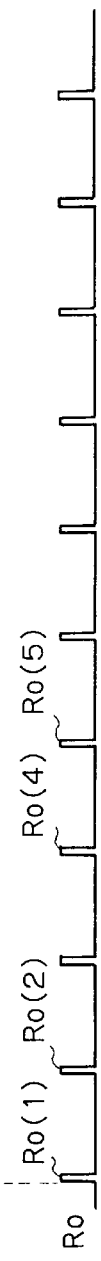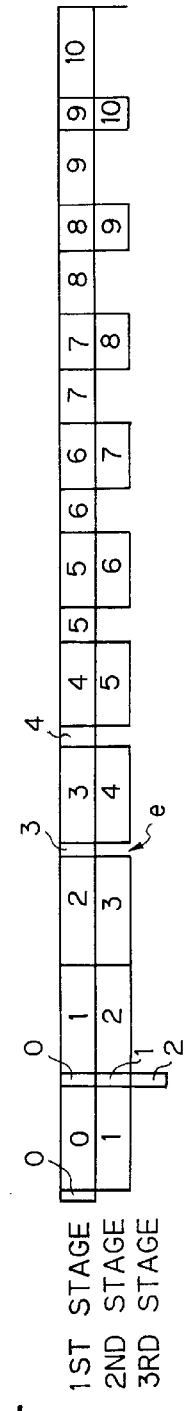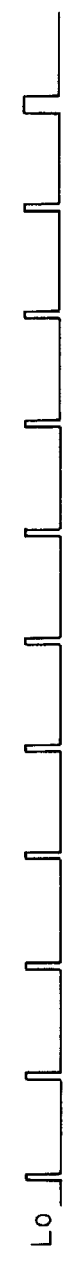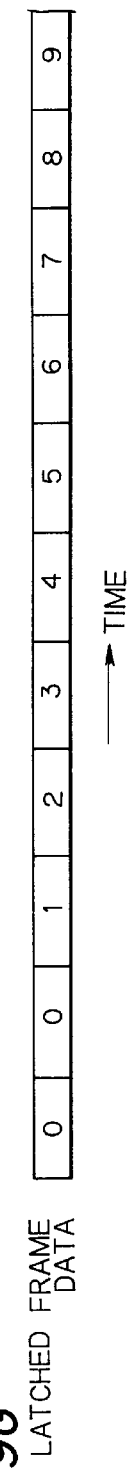

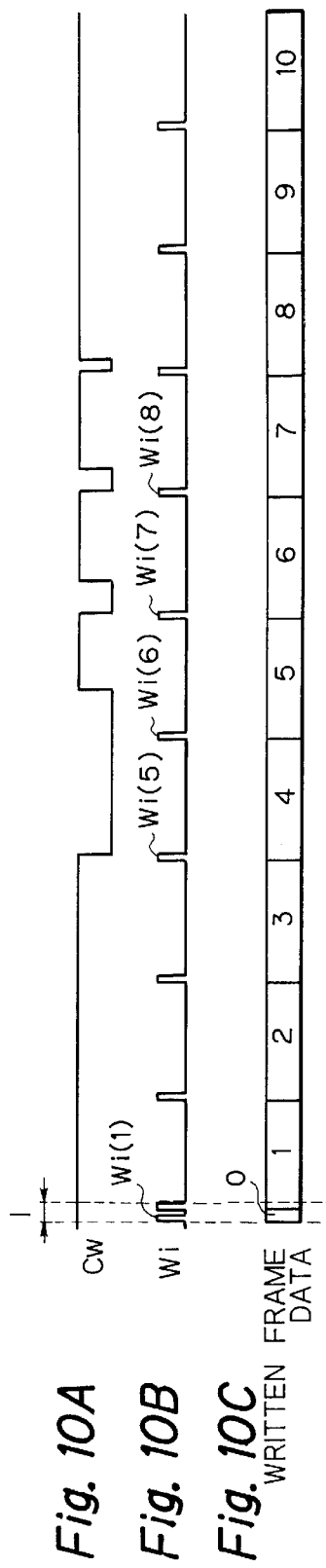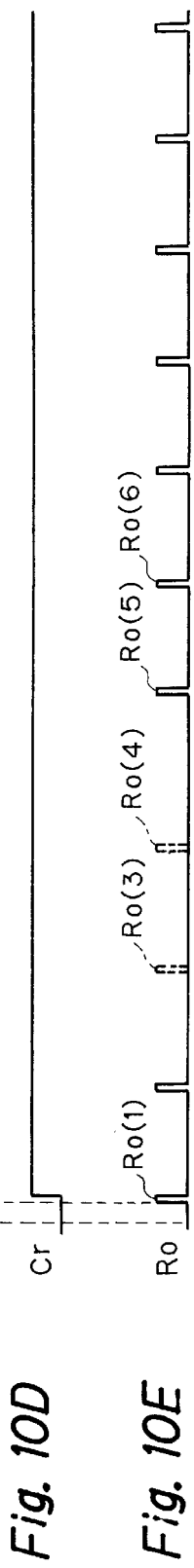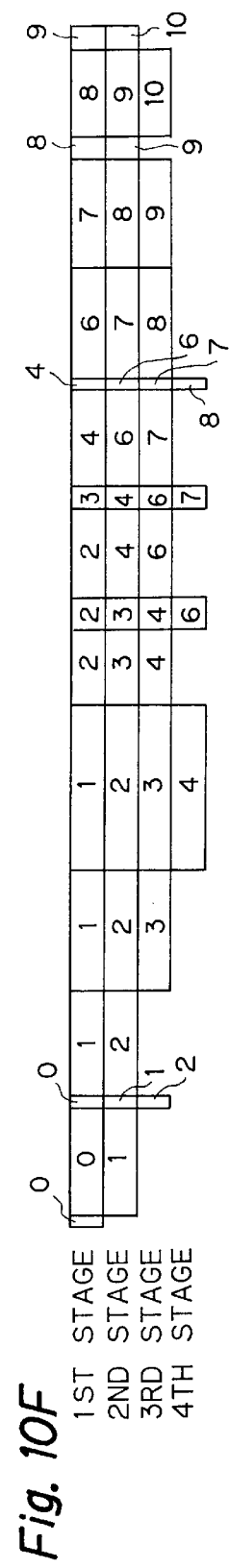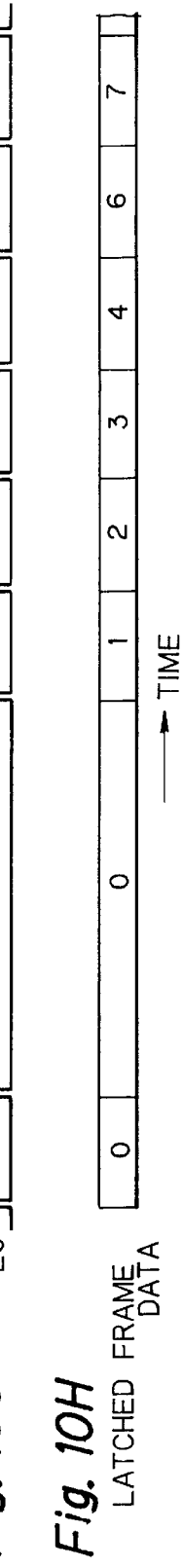

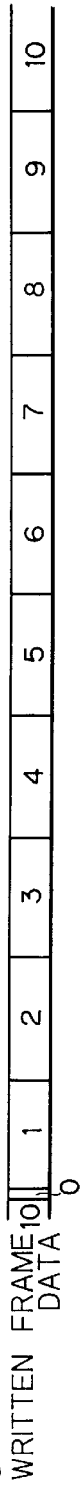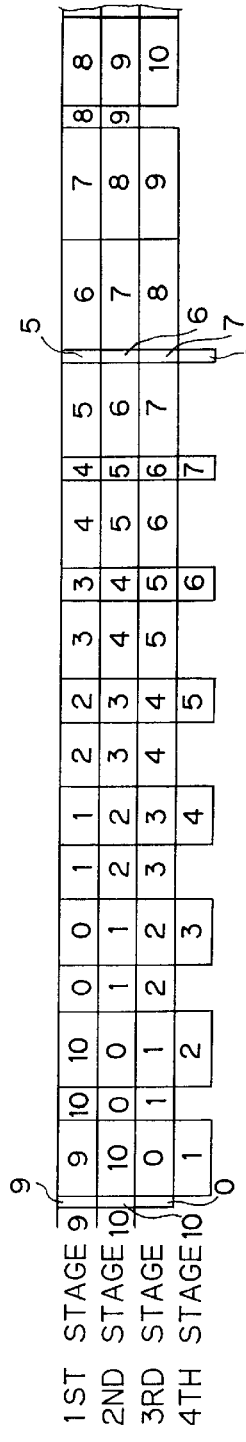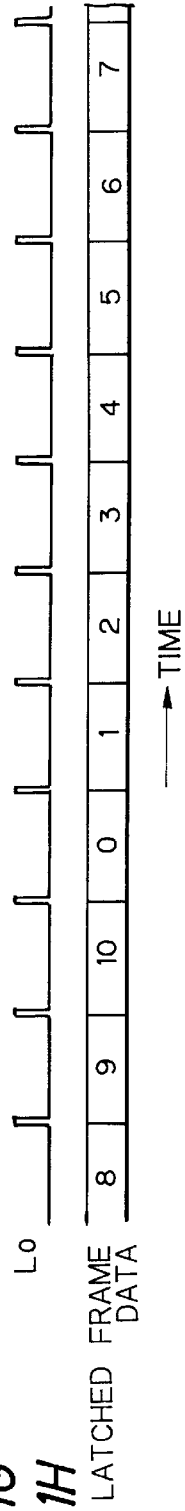

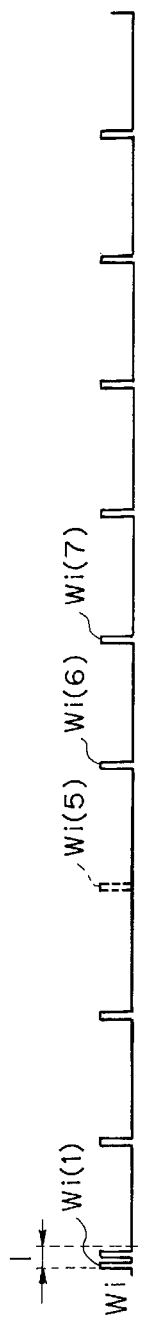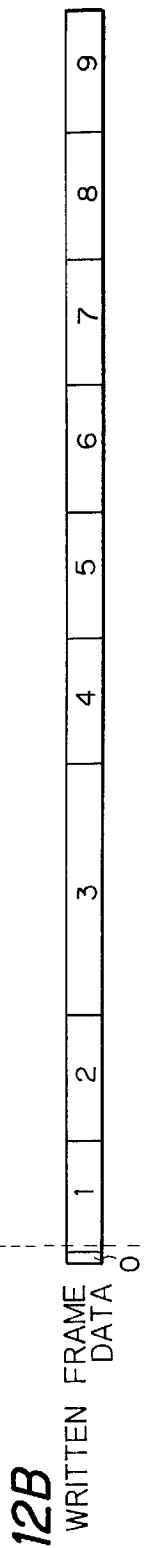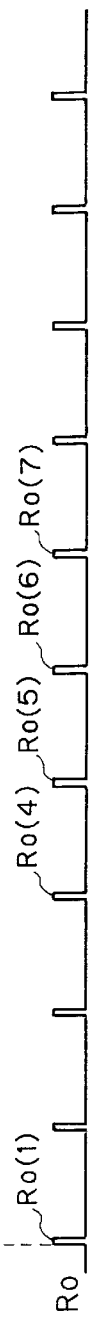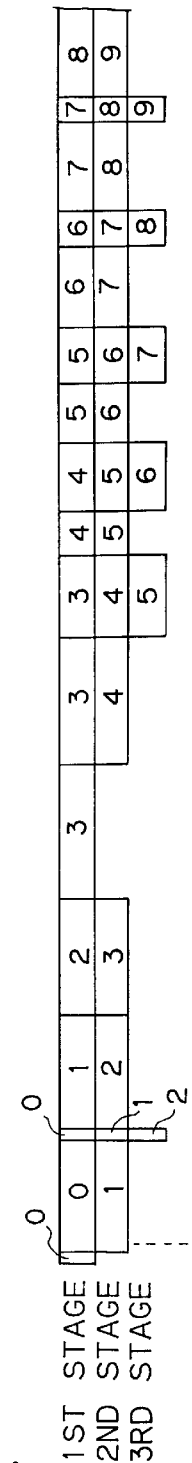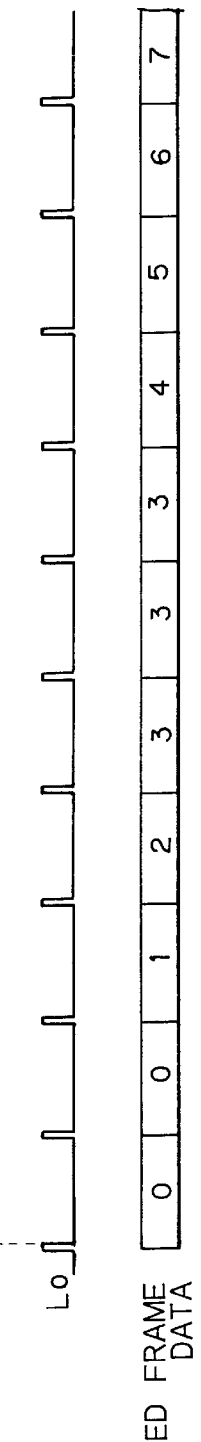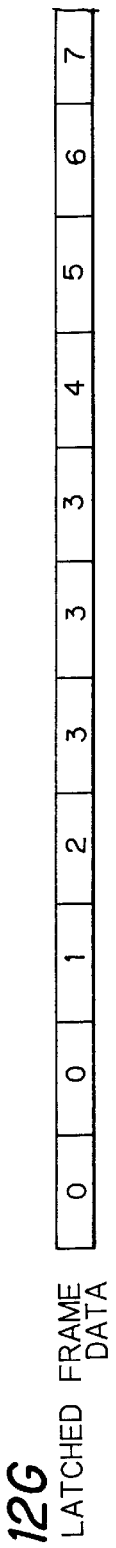

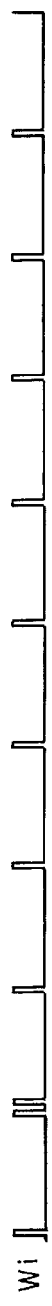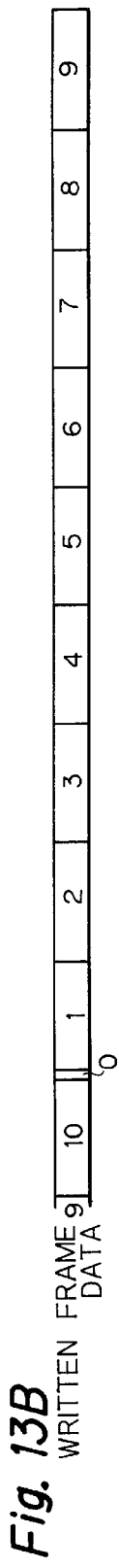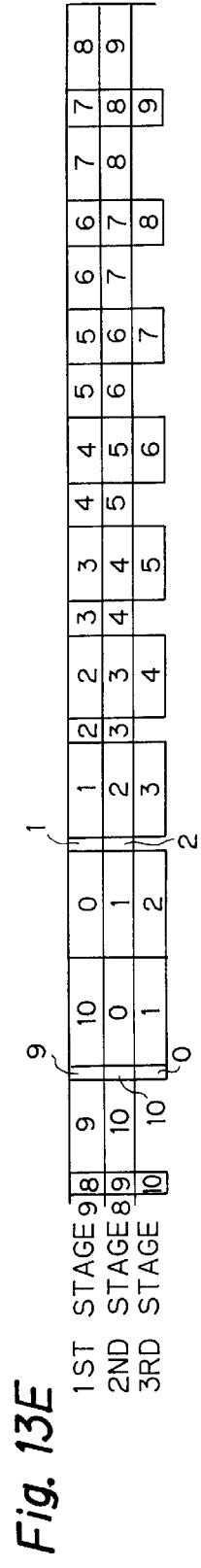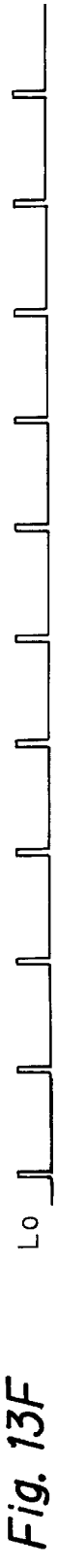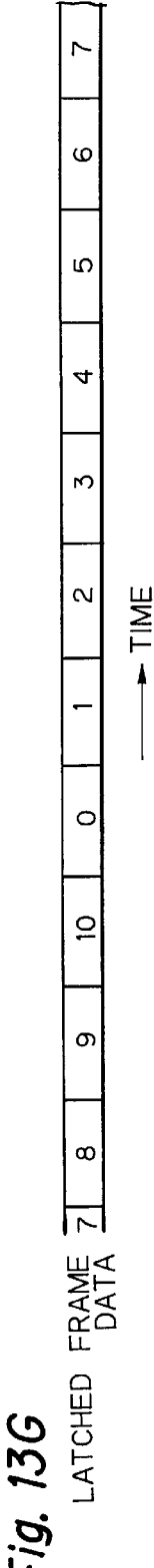
Fig. 13A  Wi
Fig. 13B  WRITTEN FRAME DATA
Fig. 13C  Cr
Fig. 13D  Ro
Fig. 13E  1ST STAGE / 2ND STAGE / 3RD STAGE
Fig. 13F  Lo
Fig. 13G  LATCHED FRAME DATA
→ TIME

DEVICE AND METHOD FOR CONVERTING A TRANSMISSION RATE BY ADDING DUMMY DATA

BACKGROUND OF THE INVENTION

1. Field of the Invention

The present invention relates to a device and a method for converting the transmission rate of digital data from a lower rate to a higher rate, and is applicable to a digital switching system or similar equipment;

2. Description of the Background Art

It is a common practice with, e.g., a digital switching system to connect a plurality of communication equipments each having a particular digital data transmission rate thereto. Therefore, a device for converting a lower transmission rate applied to it is essential that a higher transmission rate be provided for use with the digital switching system. It has been customary to use a RAM (Random Access Memory) to convert a lower transmission rate to a higher transmission rate. Specifically, digital data are written to the RAM at the lower rate and then read out of the RAM at the higher rate. The prerequisite with the RAM scheme is to obviate conflicts between the writing and the reading of digital data. To meet this prerequisite, two RAMs each having a single port are usually assigned to the writing and the reading, respectively and so configured as to effect writing and reading alternately.

However, the conversion system using two RAMs has some problems left unsolved, as follows. The system is not practicable without resorting to a function of allocating write addresses to one RAM and read addresses to the other RAM, a function of delivering digital data to the two RAMs alternately, and a function of selecting the outputs of the RAMs alternately. These functions complicate the construction of the converting device. Moreover, the system must switch the write-in and read-out on a transmission frame basis, and therefore needs a complicated circuit for generating a timing signal for switching them over. Although this problem may be solved if a switching period longer than a single multiframe period is selected, such a switching period aggravates a delay ascribable to the conversion.

SUMMARY OF THE INVENTION

It is therefore an object of the present invention to provide a transmission rate converting device having simple circuitry and capable of minimizing the delay ascribable to transmission rate conversion, and a method therefor.

In accordance with the present invention, a transmission rate converting device for receiving digital data serially at a first transmission rate and outputting digital data at a second transmission rate higher than the first transmission rate includes a memory having a write port and a read port and which is capable of writing and reading digital data at the same time. A serial-to-parallel converter receives the digital data serially at the first transmission rate and converts this data to parallel data. A data write circuit writes the parallel data in the memory via the write port in accordance with the first transmission rate. A data read circuit reads the digital data out of the memory via the read port in accordance with the second transmission rate in the order in which the data have been written. A dummy data adding circuit adds, when the digital data are written to or read out of the memory, dummy data corresponding in number to the short bits ascribable to transmission rate conversion to the digital data. A parallel-to-serial converter converts the digital data with the dummy bits to serial data and outputs the serial data at the second transmission rate.

Also, in accordance with the present invention, a transmission rate converting method for outputting digital data received serially at a first transmission rate at a second transmission rate higher than the first transmission rate includes the steps of preparing a memory having a write port and a read port and which is capable of reading and writing digital data at the same time. The method converts the digital data received at the first transmission rate to parallel data, writes the parallel data in the memory via the write port in accordance with the first transmission rate, reads the digital data out of the memory via the read port in accordance with the second transmission rate in the same order as at the time of writing, adds, when writing or reading the digital data in or out of the memory, dummy data corresponding in number to short bits ascribable to transmission rate conversion to the digital data, and converts the digital data with the dummy data to serial data and outputs the serial data at the second transmission rate.

BRIEF DESCRIPTION OF THE DRAWINGS

The objects and features of the present invention will become more apparent from consideration of the following detailed description taken in conjunction with the accompanying drawings in which:

FIGS. 3, 4, 5 and 6 outline a transmission rate conversion procedure peculiar to the embodiment of FIG. 1;

FIGS. 7A–7F are timing charts demonstrating a specific operation of the embodiment of FIG. 1 for writing digital data;

FIGS. 8A–8G are timing charts demonstrating a specific operation of the embodiment for reading the digital data;

FIGS. 9A–9G are timing charts representative of a specific operation of the embodiment of FIG. 1 to occur in an error-free condition;

FIGS. 10A–10H are timing charts representative of a specific operation to be executed by the embodiment of FIG. 1 when an error occurs in data reading;

FIGS. 11A–11H are timing charts continued from FIGS. 10A–10H, respectively;

FIGS. 12A–12G are timing charts representative of a specific operation to be executed by the embodiment of FIG. 1 when an error occurs in data writing; and FIGS. 13A–13G are timing charts continued from FIGS. 12A–12G, respectively.

DESCRIPTION OF THE PREFERRED EMBODIMENT

Figure 1:
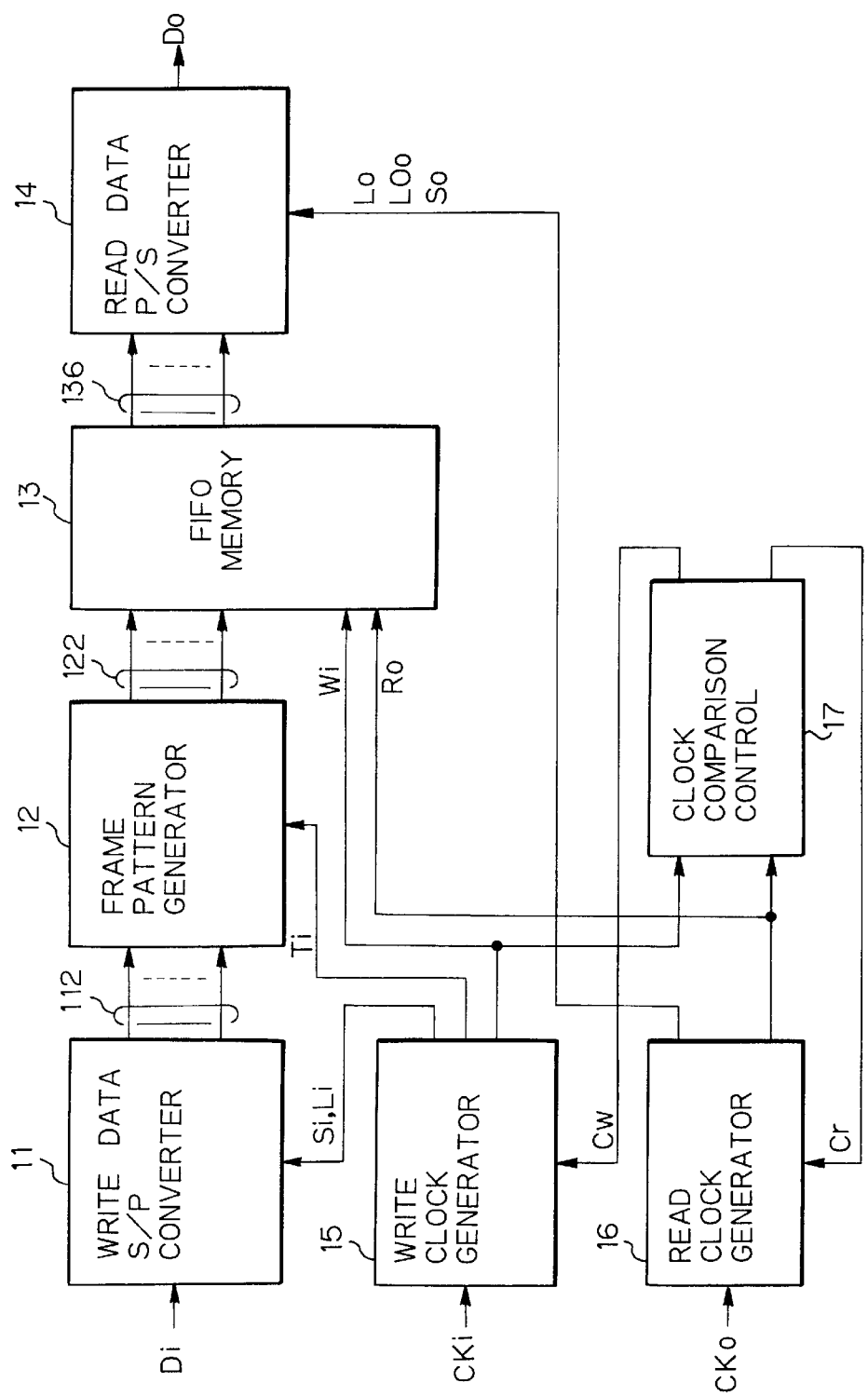
FIG. 1 is a schematic block diagram showing a transmission rate converting device embodying the present invention.

Referring to FIG. 1 of the drawings, a transmission rate converting device embodying the present invention is shown. The device is applicable to, e.g., a digital switching system for converting input data Di arriving in the form of transmission frames at a rate of, e.g., 8 kbps (kilobits per second) to output data Do having a higher transmission rate, e.g., 9.6 kbps. Of course, the present invention is applicable even to equipments other than a digital switching system.

As shown in FIG. 1, the converting device has a write data serial-to-parallel (S/P) converter 11, a frame pattern generator 12, a FIFO (First-In First-Out) memory 13, a read data parallel-to-serial (P/S) converter 14, a write clock generator 15, a read clock generator 16, and a clock comparison and control 17.

The write data S/P converter 11 receives serial input data Di and transforms the serial data to parallel data by treating each transmission frame of the data before conversion as a unit, for example. For this purpose, the S/P converter 11 has a shift register and a latch circuit (not shown ). The shift register has, e.g., eleven consecutive stages and receives the input data Di at its first stage. The shift register is constructed such that data written to the consecutive stages are sequentially shifted to the following stages in response to a shift clock Si fed from the write clock generator 15. The outputs of the register stages are connected in parallel to, e.g., eleven consecutive latch stages constituting the latch circuit. The latch circuit receives the data from the consecutive stages of the shift register in parallel and latches them in response to a latch clock Li also fed from the write clock generator 15. The outputs 112 of the latch stages are connected to the frame pattern generator 12 in parallel.

The frame pattern generator 12 adds to the outputs 112 of the S/P converter 11 dummy bits comprising a number of short bits ascribable to the transmission rate conversion. The addition of the dummy bits is effected such that each multiframe of nonconverted data forms a multiframe of converted data. Specifically, the frame pattern generator 12 has a shift register, not shown, having consecutive stages greater in number than the parallel outputs 112 (eleven in the embodiment described herein) of the S/P converter 11 by one. The eleven outputs 112 of the S/P converter 11 are connected in parallel to the lower eleven stages of the shift register, in the frame pattern generator 12. The frame pattern generator 12 receives an insertion timing signal Ti from the write clock generator 15 and inserts a frame for transmission rate conversion to the data stored therein in synchronism with the timing signal Ti. Data 122 output from the frame pattern generator 12, including the dummy data, are input to the FIFO memory 13.

The FIFO memory 13 has a RAM 131 (see FIG. 2) which will be described in detail later. The memory 13 sequentially writes the parallel outputs 122 of the frame pattern generator 12 into the RAM 131 frame by frame, while sequentially reading them out of the RAM 131 on a FIFO basis. The memory 13 writes the data into the RAM 131 in response to a write clock Wi fed from the write clock generator 15 and reads this data out in response to a read clock R0 fed from the read clock generator 16. The memory 13 has parallel data outputs 136 connected to the inputs of the read data P/S converter 14.

The read data P/S converter 14 converts the output data of the FIFO memory 13 to serial data. Specifically, the P/S converter 14 has a latch circuit and a shift register, (not shown). The latch circuit of the converter 14 receives the output data 136 of the memory 13 in parallel and latches the output data 136 in response to a latch clock Lo fed from the read clock generator 16. The consecutive stages of the converter 14 latch circuit have their outputs connected to the consecutive stages of the converter 14 shift register in parallel. In the illustrative embodiment, the shift register has twelve consecutive stages; an output Do is connected to the last or twelfth stage. The shift register stages receive the data from the latch circuit in response to a load clock LOo fed from the read clock generator 16. At the same time, the shift register sequentially transfers the data to the following stages in response to a shift clock So also fed from the read clock generator 16.

The write clock generator 15 generates, in response to an input clock CKi fed from an external system, various kinds of clocks necessary for the input data Di to be written in, i.e., the shift clock Si, latch clock Li, insertion timing signal Ti, and write clock Wi. Likewise, the read clock generator 16 generates, in response to an output clock CKo also fed from the external system, various kinds of clocks necessary for the data to be read out, i.e., the read clock Ro, latch clock Lo, load clock LOo, and shift clock So.

The clock comparison and control 17 determines the amount of parallel data, i.e., the number N of frames (N being a natural number) stored in the RAM 131 of the FIFO memory 13. Also, the clock comparison and control 17 controls the writing and reading of data such that the number N remains in a preselected range. To determine the number N of frames, the control 17 may produce a difference between the number of write clock pulses Wi generated and the number of read clock pulses R0 generated. To control the writing and reading of data, the control 17 may deliver a write clock control signal Cw and a read clock control signal Cr to the write clock generator 15 and read clock generator 16, respectively, so as to control the generation of the write clock Wi and read clock Ro. In the illustrative embodiment, as shown in FIG. 10A specifically, the write control signal Cw permits the generation of the write clock Wi while in a high level, but inhibits it while in a low level. Likewise, as shown in FIG. 9C specifically, the read control signal Cr permits the generation of the read clock Ro while in a high level, but inhibits it while in a low level.

In the disclosed embodiment, clock comparison and control 17 detects the number N of frames stored in the RAM 131 and controls the writing and reading of data such that the number N remains in a preselected range, as stated above. However, this control is not necessary when it comes to environments of the kind rarely causing read errors and write errors to occur.

Figure 2:
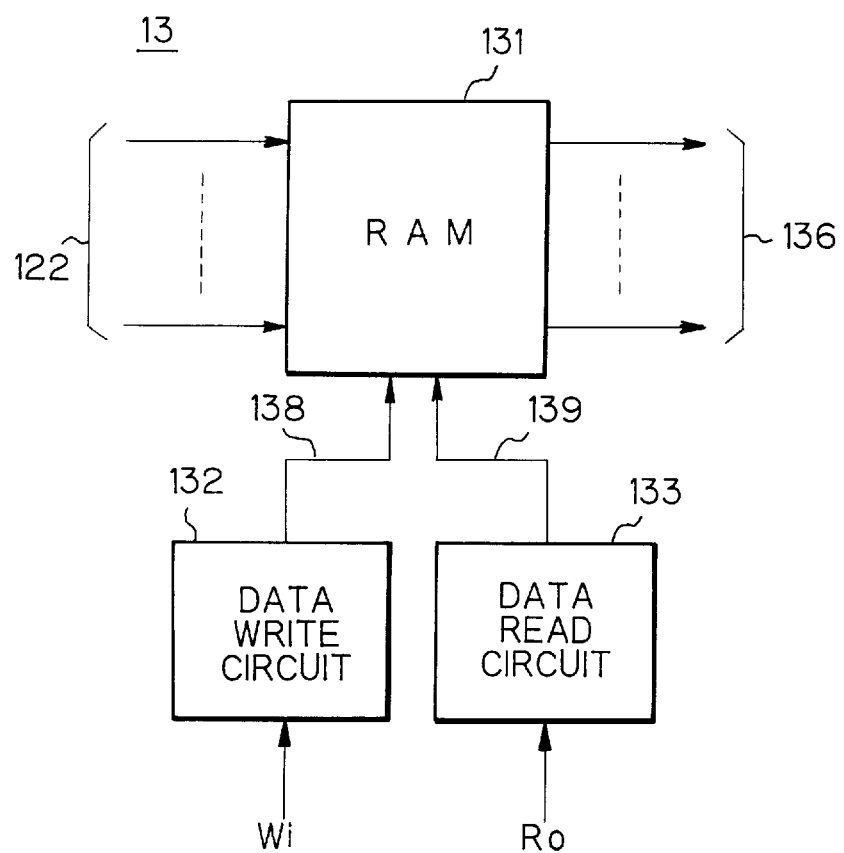
FIG. 2 is a schematic block diagram showing a specific configuration of a FIFO (First-In First-Out) memory circuit included in the embodiment of FIG. 1.

FIG. 2 shows a specific configuration of the FIFO memory 13. As shown, the memory 13 has a data write circuit 132 and a data read circuit 133 in addition to the previously mentioned RAM 131. The RAM 131 has at least two parallel ports and allows the writing of data and the reading of data to be executed independently of each other. One of the parallel ports is connected to the outputs 122 of the frame pattern generator 12 while the other parallel port 136 is connected to the inputs of the read data P/S converter 14. The RAM 131 has a capacity great enough to store an amount of data corresponding to a preselected number of frames of data, e.g., four frames of data in a rewritable manner. The data write circuit 132 and data read circuit 133 respectively control the writing of data into the RAM 131 and the reading of data out of the RAM 131 via control lines 138 and 139 respectively. Specifically, in response to the write clock Wi, the write circuit 132 addresses the memory location of the RAM 131 via the control line 138 and thereby writes the outputs of the frame pattern generator 12 into the RAM 131 via the parallel ports 122 frame by frame. On the other hand, the read circuit 133 addresses, in response to the read clock Ro, the memory location of the RAM 131 via the control line 139 and thereby reads the data out of the RAM 131 via the parallel ports 136 in the order in which they have been written into the RAM 131.

In the illustrative embodiment, to implement the FIFO function, the memory 13 has a first to a fourth memory stage corresponding to four frames of data. More specifically, when the write clock Wi is generated, the data received from the outputs 122 of the frame pattern generator 12 are written to the fourth stage of the RAM 131 on a frame basis. When the read clock Ro is generated, the data stored in the fourth stage to the first stage are sequentially shifted one stage toward the first stage. At this instant, the data having been stored in the first stage are discarded while the data having been stored in the second stage are shifted to the first stage. The data shifted to the first stage are fed to the read data P/S converter 14 in response to the latch clock Lo generated next.

In operation, the transmission rate converting device converts data having a rate of 8 kbps to data having a transmission rate of 9.6 kbps. Reference will be made to FIG. 3 for outlining the conversion of the transmission rate to be executed by the disclosed embodiment. As shown, the input data Di are serial data having consecutive bits 0, 1, 2 and so forth. Eleven consecutive bits of the serial data Di are transformed to parallel data at a time. Each group eleven bits constitutes one frame of 8 kbps data. When the device converts the 8 kbps data to 9.6 kbps data, each multiframe turns out the respective multiframe of 9.6 kbps data. For the conversion, the device adds one bit of dummy data to each frame to produce a new twelve-bit frame, and adds twelve bits (number of bits of a 9.6 kbps frame) of dummy data to each group of ten frames, as will be described specifically hereinafter.

FIG. 4 shows specific 8 kbps data 0 through A9 having a multiframe pattern, i.e., ten frames each having eleven bits. FIG. 5 shows 9.6 kbps data produced by converting the 8 kbps data of FIG. 4 and having a multiframe pattern, i.e., eleven frames each having twelve bits. As FIG. 5 indicates, one bit of dummy data is added to the head (zeroth bit b0) of each 8 kbps frame while twelve bits of dummy data are added to the head (zeroth frame) of each group of ten 8 kbps frames. The one bit of dummy data and the twelve bits of dummy data are implemented as "1" and "0", respectively.

The multiframe shown in FIG. 4 has 110 bits in total, i.e., 11×10=110. The period of time necessary for all of the 110 bits of data to be received is 13.75 milliseconds, i.e., (1/8k)×110=13.75. On the other hand, the multiframe shown in FIG. 5 has 132 bits in total, i.e., 12×11=132. The period of time necessary for all the 132 bits of data to be sent is 13.75 milliseconds, i.e., (1/9.6k)×132=13.75. That is, the period of time for receipt and the period of time for transmission are equal to each other. Therefore, the 8 kbps data can be converted to 9.6 kbps data without any surplus or deficiency. The 9.6 kbps data having the multiframe pattern are transformed to serial data frame by frame. FIG. 6 shows serial output data Do derived from the parallel data shown in FIG. 5.

To reconvert the 9.6 kbps data to the original 8 kbps data, the dummy data should only be removed from the 9.6 kbps data. The dummy data can be located only if the frame whose twelve bits are all "0" is detected. This is because whatever the bit arrangement of the 8 kbps data may be, the 9.6 kbps data have a data sequence of all "0" only in the zeroth frame thereof.

In the above embodiment, to make up for the short bits ascribable to the conversion of the transmission rate, dummy bits are added to each multiframe before the conversion in such a manner as to form a converted multiframe. Alternatively, dummy data may be added to, e.g., the tail of a stream of received data, if desired.

The procedure for converting the transmission rate will be described on the basis of the circuit arrangement shown in FIGS. 1 and 2. First, how the input data Di are written to the FIFO memory 13 will be described with reference to FIGS. 7A–7F.

As shown in FIG. 7A, the data Di input to the write data S/P converter 11 have a serial format. As shown in FIG. 7C, the data Di are sequentially shifted by the shift register, not shown, of the S/P converter 11 in response to the shift clock Si (FIG. 7B) fed to the converter 11 from the write clock generator 15. As a result, the data Di are transformed to eleven-bit parallel data. The parallel data are latched by the latch circuit, not shown, of the S/P converter 11 in response to the latch clock Li (FIG. 7D) also fed from the write clock generator 15. The latched data are fed to the frame pattern generator 12 in parallel via the connection line 112.

The frame pattern generator 12 shifts the input parallel data by one bit with its shift register, not shown, and then adds the dummy bit "1" to the head of the data. As a result, twelve-bit parallel data having the dummy bit "1" on its leading bit b0 (FIG. 5), i.e., 9.6 kbps frame data are output from the frame pattern generator 12 in parallel, as shown in FIG. 7E. The frame data are fed from the circuit 12 to the FIFO memory 13 via the connection line 122.

The twelve-bit parallel frame data are sequentially written to the RAM 131 of the FIFO memory 13 by the data write circuit 132 in response to the write clock Wi (FIG. 7F) fed from the write clock generator 15. At this instant, just before the parallel data a shown in FIG. 7E and corresponding to the first frame having bits #0 through #10 (FIG. 3) are written to the RAM 131, the frame pattern generator 12 outputs twelve-bit parallel data b which are all "0" (FIG. 7E) as the zeroth frame (FIG. 5). The parallel data b are written to the RAM 131 in response to a pulse c of the write clock Wi (FIG. 7F) and appear just before a pulse d (FIG. 7F) for writing the first frame of parallel data in the RAM 131. Consequently, the data Di are written to the RAM 131 in the multiframe format shown in FIG. 5.

How the data Di written to the FIFO memory 13 by the above procedure are read out will be described with reference to FIGS. 8A–8G. The parallel data stored in the RAM 131 of the memory 13 are shifted one stage toward the leading stage or first stage in response to a pulse of the read clock Ro (FIG. 8B) fed from the read clock generator 16. As a result, the parallel data existing in the first stage are discarded while the parallel data existing in the second stage and successive stages are respectively shifted to the first stage and successive stages. The data newly stored in the first stage are delivered to the latch circuit, not shown, of the read data P/S converter 14 via the connection line 136 in response to a pulse of the latch clock Lo (FIG. 8C) generated by the clock generator 16 (FIG. 8D).

The parallel data latched by the converter 14 latch circuit are loaded in the shift register, not shown, of the latch circuit in response to a pulse of the load clock LOo (FIG. 8E) fed from the read clock generator 16. As shown in FIG. 8F, the parallel data are sequentially shifted in the converter 14 shift register in response to the shift clock So also fed from the clock generator 16. As a result, the output data Do are serially output from the memory 13, as shown in FIG. 8G.

While the disclosed embodiment adds the dummy data at the time when the data are written to the RAM 131, the dummy data may be added when the data are read out of the RAM 131, if desired.

Control over the above writing procedure and reading procedure will be described with reference to FIGS. 9A–13G. The disclosed embodiment controls the writing and reading procedures such that the number N of frames stored in the RAM 131 remains in a preselected range, as stated earlier. This kind of control successfully copes with read errors and write errors which may occur in the circuitry.

Specifically, the clock comparing and control 17 controls the writing and reading procedures such that the number N of frames is greater than 1 inclusive, but smaller than 4 inclusive ($1 \leq N \leq 4$). However, in the initial period I (e.g. FIG. 9A), the control 17 maintains the number N greater than 2 inclusive, but smaller than 4 inclusive ($2 \leq N \leq 4$). The terms "initial period I" refer to the interval between the first pulse of the write clock Wi and the first pulse of the read clock Ro, or when an error occurs in, e.g., the write clock Wi, refer to the interval between the first normal write clock Wi to appear after the inhibition of the generation of the read clock Ro and the first read clock Ro.

To determine the number N of frames stored in the RAM 131, the control 17 produces a difference between the number x of pulses of the write clock Wi having appeared and the number y of pulses of the read clock Ro having appeared, i.e., x−y. The control 17 controls, based on the determined number N, the generation of the write clock Wi and that of the read clock Ro with the control signals Cw and Cr, respectively.

FIGS. 9A–9G are timing charts demonstrating a specific operation to occur when the writing and reading procedures are free from errors. The initial period I is assumed to be the interval between the first pulse Wi(1) of the write clock Wi (FIG. 9A) and the first pulse Ro(1) of the read clock Ro (FIG. 9D). FIG. 9B shows the frame data to be written to the RAM 131 in response to the write clock Wi. FIG. 9C shows the control signal Cr generated by the control 17 for controlling the generation of the read clock Ro. FIG. 9E shows the frame data stored in the consecutive stages of the RAM 131; the frame data written first are stored in the first stage while the following frame data are sequentially written to the second stage and successive stages. FIG. 9G shows the frame data latched by the latch clock Lo (FIG. 9F).

As shown in FIG. 9C, the read control signal Cr fed from the control 17 to the read clock generator 16 goes low when N representative of the number of frames stored in the RAM 131 is incremented to 1. As a result, the clock generator 16 is inhibited from generating the read clock Ro. This prevents the number N from decreasing to zero in the RAM 131.

In FIGS. 9A–9G, the write clock Wi and read clock Ro are assumed to be free from errors. Therefore, after the read control signal Cr has gone low, but before the next read clock Ro is generated, the write clock Wi is output. As a result the number N is incremented to 2 in the RAM 131, so that the read control signal Cr goes high. As a result, the next read clock Ro is not inhibited from being generated. For example, when the fourth pulse Ro(4) of the clock Ro is generated, the number N is incremented to 1 (e, FIG. 9E) in the RAM 131 with the result that the read control signal Cr goes low (f, FIG. 9C). However, the fifth write clock pulse Wi(5) is output before the fifth read clock pulse Ro(5), incrementing the number N to 2 in the RAM 131. In response, the control 17 causes the read control signal Cr to go high. This insures the generation of the fifth read clock pulse Ro(5).

In the initial period I, the read control signal Cr goes high in response to the read clock Ro appearing for the first time after the number N has exceeded 2 in the RAM 131. Therefore, in the specific procedure of FIGS. 9A–9G, the first read clock pulse Ro(1) is inhibited from being generated. Thereafter, the read control signal Cr goes high on the elapse of the initial period I, allowing the second read clock pulse Ro(2) to be generated.

Specific control to be executed when an error occurs in the reading procedure will be described with reference to FIGS. 10A–11H. It is to be noted that FIGS. 10A–10H are continued to FIGS. 11A–11H, respectively. Again, the initial period I is assumed to be the interval between the first write clock pulse Wi(1) and the first read clock pulse Ro(1), as shown in FIGS. 10A–10F. In FIGS. 10A–11H, the write control signal Cw is shown in addition to the signals shown in FIGS. 9A–9G.

Assume that the third and fourth read clock pulses Ro(3) and Ro(4) (FIG. 10E) are lost due to some cause despite the read control signal Cr being in the high level (FIG. 10D). Then, the number N of frames stored in the RAM 131 reaches 4 when the fifth write clock pulse Wi(5) (FIG. 10B) is output. In response, the control circuit 17 causes the write control signal Cw to go low and thereby inhibits the write clock Wi from being generated. The inhibition is maintained until the next read clock Ro, i.e., pulse Ro(5) has been output at the expected or normal timing. Specifically, the fifth read clock pulse Ro(5) is output during the interval between the sixth write clock pulse Wi(6) and the seventh write clock pulse Wi(7). The sixth write clock pulse Wi(6) is inhibited from being generated because the write control signal Cw is in the low level, so that the number N is prevented from being incremented to 5 in the RAM 131.

When the fifth read clock pulse Ro(5) is output, the number N of frames is decremented to 3 in the RAM 131. In response, the control 17 causes the write control signal Cw to go high and thereby allows the seventh write clock pulse Wi(7) to be output. Consequently, the number N is again incremented to 4 in the RAM 131 with the result that the control 17 again causes the write control signal Cw to go low and thereby inhibits the write clock Wi from being generated. In this case, however, the sixth read clock pulse Ro(6) is output before the next write clock Wi, i.e., the eighth write clock pulse Wi(8), decrementing the number N to 3 in the RAM 131. In response, the control 17 causes the write control signal Cw to go high so as to allow the eighth write clock pulse Wi(8) to be output. In this manner, when a read error occurs, the control 17 inhibits the write clock Wi from being generated and thereby prevents the number N from increasing to 5 or above in the RAM 131.

Specific control to be executed when an error occurs in the writing procedure will be described with reference to FIGS. 12A–13G. FIGS. 12A–12G are continued to FIGS. 13A–13G, respectively. Assume that the fourth read clock pulse Ro(4) (FIG. 12D) is output and caused the number N to decrease to 1 in the RAM 131, and then the fifth write clock Wi(5) expected to appear is lost due to some cause. Then, when the fourth read clock pulse Ro(4) is output, the control 17 causes the read control signal Cr to go low (FIG. 12C). This condition would be cancelled if the fifth write clock pulse Wi(5) were output. However, because the fifth write clock pulse Wi(5) is lost, the read control signal Cr does not go high and inhibits the fifth read clock pulse Ro(5) from being output.

Subsequently, when the sixth write clock pulse Wi(6) is output, the number N is incremented to 2 in the RAM 131. Then, the read control signal Cr is expected to go high. However, the control 17 interprets the sixth write clock pulse Wi(6) as being the first write clock Wi and interprets the sixth read clock pulse Ro(6) following the clock pulse Wi(6) as being the first read clock Ro. That is, the control 17 considers the interval between the generation of the sixth write clock pulse Wi(6) and the sixth read clock pulse Ro(6) as the initial period T. As a result, the read control signal Cr does not go high despite the increase of the number N to 2 in the RAM 131 and thereby inhibits the sixth read clock pulse Ro(6) from being generated. On the elapse of the initial period I following the sixth read clock pulse Ro(6), the control 17 causes the read control signal Cr to go high and allows the seventh read clock pulse Ro(7) to be output. In this manner, in the event of a write error, the control 17 inhibits the generation of the read clock Ro thereby preventing the number N from decreasing to zero in the RAM 131.

As stated above, in the illustrative embodiment, the RAM 131 has parallel input and output ports and allows data to be written thereto or read therefrom by an independent operation. The RAM 131 constitutes the FIFO memory 13 for converting the transmission rate of digital data. It is therefore possible to execute the conversion by use of a single RAM. As a result, the circuit scale including the memory circuit is substantially halved, compared to the conventional circuitry. This simplifies the overall arrangement of the converting device. In addition because a timing signal for switching write-in and read-out is not necessary, the timing generating circuitry is simple in construction.

The disclosed embodiment determines the number N of frames stored in the RAM 131 and controls the writing and reading of data such that the number N remains within a preselected range. Hence, a read error or a write error can be rapidly dealt with. If desired, the upper limit of the number N may be increased to guarantee the supply of data to transmitting equipment, if desired.

The disclosed embodiment adds dummy data to digital data such that each multiframe not subjected to transmission rate conversion forms a multiframe subjected to the conversion. Hence, when receiving equipment restores the transmission rate by removing the dummy data, it can automatically identify the positions where the dummy data are added to the digital data. This eliminates the need for an arrangement for sending the positions of the dummy data from the transmitting equipment to the receiving equipment.

A conventional transmission rate converting device includes a portion shared by a data writing or receiving section and a data reading or transmitting section. This renders timing design difficult when the difference in phase between transmission and receipt is not known. By contrast, the writing section and reading section of the disclosed embodiment are fully independent of each other, so that easy timing design is achievable even in the above condition.

When a momentary shut-off or similar error occurs in a timing signal fed from the outside for transmission or receipt, the conventional device must control the address, change the switching timing, and perform other various special operations. These special operations are critical with respect to the destruction of data and the control over various circuits. In the illustrative embodiment, only several frames are destroyed just after the write clock Wi or the read clock Ro has been lost.

In summary, in accordance with the present invention, a FIFO circuit is implemented by a memory having a write port and a read port and allowing writing and reading to be executed independently of each other. The FIFO circuit converts the transmission rate of the input digital data. This not only simplifies the circuitry of a transmission rate converting device but also reduces delay ascribable to the conversion of the transmission rate.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A transmission rate converging device for receiving input digital data serially at a first transmission rate and outputting output digital data at a second transmission rate higher than said first transmission rate, said device comprising:

serial-to-parallel converting means for receiving the input digital data serially at said first transmission rate and converting said input digital data to parallel digital data;

a frame pattern generator having an input coupled to said serial-to-parallel converting means and an output, sad frame pattern generator adding dummy data to said parallel digital data, said dummy data corresponding in number to short bits ascribable to a transmission rate conversion from the first transmission rate to the second transmission rate;

a first-in first-out (FIFO) memory having a write port coupled to the output of said frame pattern generator, and a read port, said FIFO memory allowing digital data to be simultaneously written into the write port and read out of the read port thereof, said FIFO memory further comprising a data writing means for writing said parallel digital data and said dummy data into said FIFO memory via said write port in response to a write clock having said first transmission rate, and data reading means for reading said parallel digital data and said dummy data out of said FIFO memory via said read port in response to a read clock having said second transmission rate, the order in which said digital data is read out of said FIFO memory being the same as the order in which said digital data is written into said FIFO memory; and a parallel-to-serial converting means for converting the parallel digital data with said dummy data added thereto output from the read port of said FIFO memory to serial digital data, said parallel-to-serial converting means outputting said serial digital data at said second transmission rate.

2. A device in accordance with claim 1 which further comprises a write clock generator coupled to said serial-to-parallel converting means, said frame pattern generator, and said FIFO memory;

a read clock generator coupled to said FIFO memory and said parallel-to-serial converting means; and a clock comparison control coupled to said write clock generator and said read clock generator for receiving said write clock and said read clock respectively therefrom, said clock comparison control providing a write clock control signal to said write clock generator and a read clock control signal to said read clock generator for determining a number of frames stored in said FIFO memory.

3. A device in accordance with claim 2 wherein said write clock generator provides a shift clock and a latch clock to said serial-to-parallel converting means, an insertion timing signal to said frame pattern generator, and said write clock to said FIFO memory; and said read clock generator provides said read clock to said FIFO memory, and latch, load and shift clocks to said parallel-to-serial converting means.

4. A transmission rate converging device for receiving input digital data serially at a first transmission rate and outputting output digital data at a second transmission rate higher than said first transmission rate, said device comprising:

a serial-to-parallel converter for receiving the input digital data serially at said first transmission rate and converting said input digital data to parallel digital data;

a frame pattern generator having an input coupled to said serial-to-parallel converter and an output, sad frame pattern generator adding dummy data to said parallel digital data, said dummy data corresponding in number to short bits ascribable to a transmission rate conversion from the first transmission rate to the second transmission rate;

a first-in first-out (FIFO) memory having a write port coupled to the output of said frame pattern generator, and a read port, said FIFO memory allowing digital data to be simultaneously written into the write port and read out of the read port thereof, said FIFO memory further comprising a data write circuit for writing said parallel digital data and said dummy data into said FIFO memory via said write port in response to a write clock having said first transmission rate, and a data read circuit for reading said parallel digital data and said dummy data out of said FIFO memory via said read port in response to a read clock having said second transmission rate, the order in which said digital data is read out of said FIFO memory being the same as the order in which said digital data is written into said FIFO memory;

a parallel-to-serial converter for converting the parallel digital data with said dummy data added thereto output from the read port of said FIFO memory to serial digital data, said parallel-to-serial converter outputting said serial digital data at said second transmission rate;

a write clock generator coupled to said serial-to-parallel converter, said frame pattern generator, and said FIFO memory;

a read clock generator coupled to said FIFO memory and said parallel-to-serial converter; and a clock comparison control coupled to said write clock generator and said read clock generator for receiving said write clock and said read clock respectively therefrom, said clock comparison control providing a write clock control signal to said write clock generator and a read clock control signal to said read clock generator for determining a number of frames stored in said FIFO memory.

5. A device in accordance with claim 4 wherein said write clock generator provides a shift clock and a latch clock to said serial-to-parallel converter, an insertion timing signal to said frame pattern generator, and said write clock to said FIFO memory; and said read clock generator provides said read clock to said FIFO memory, and latch, load and shift clocks to said parallel-to-serial converter.

* * * * *